United States Patent Office 3,410,386
Patented Nov. 12, 1968

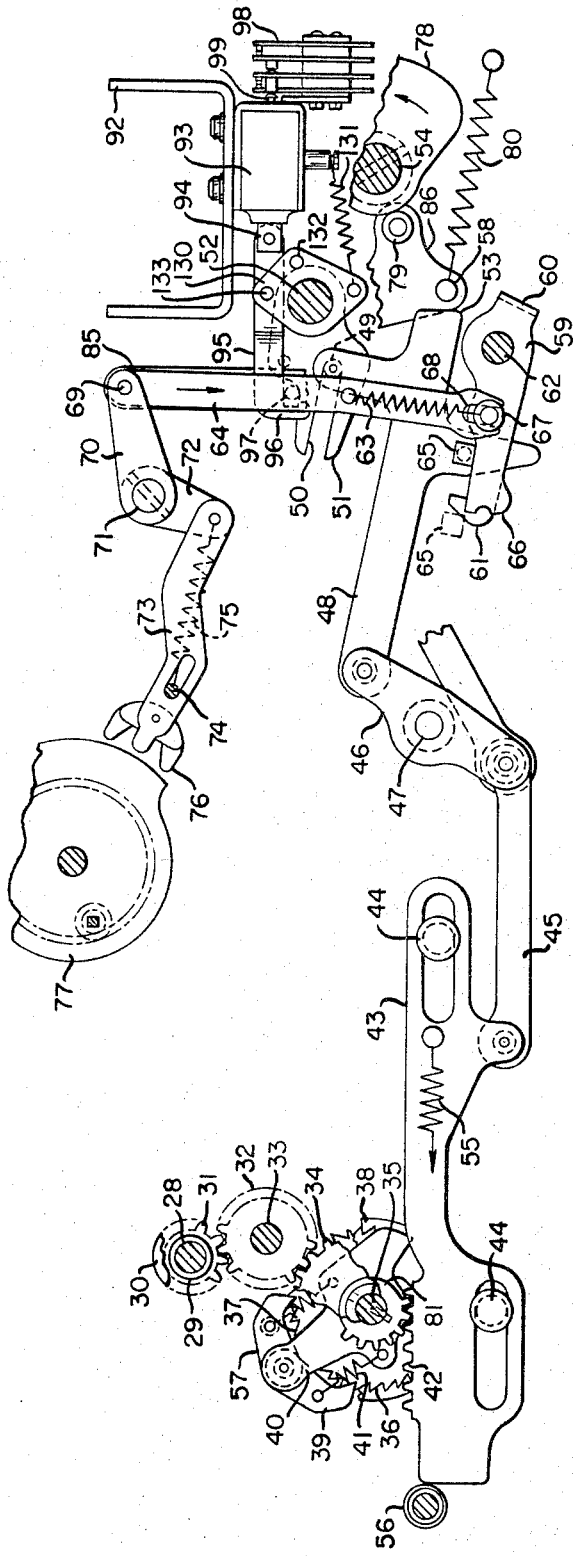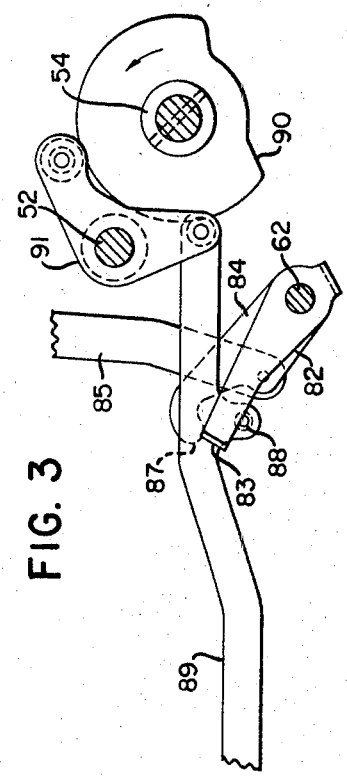

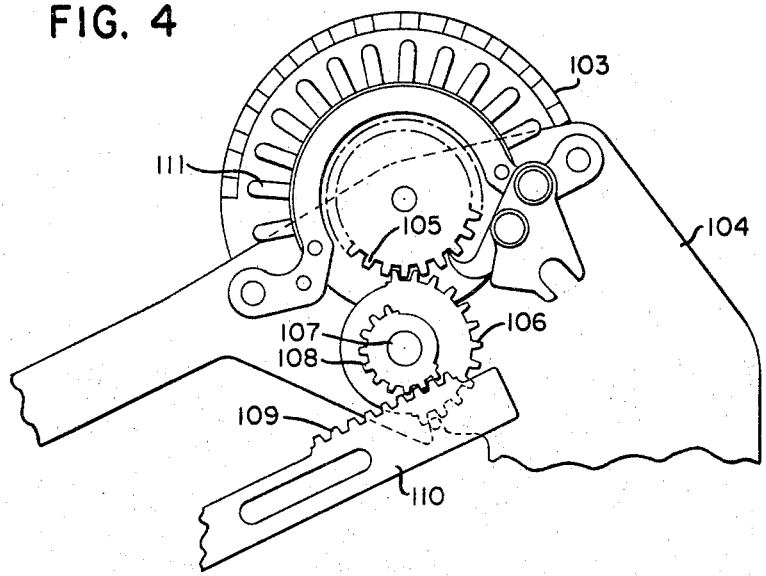

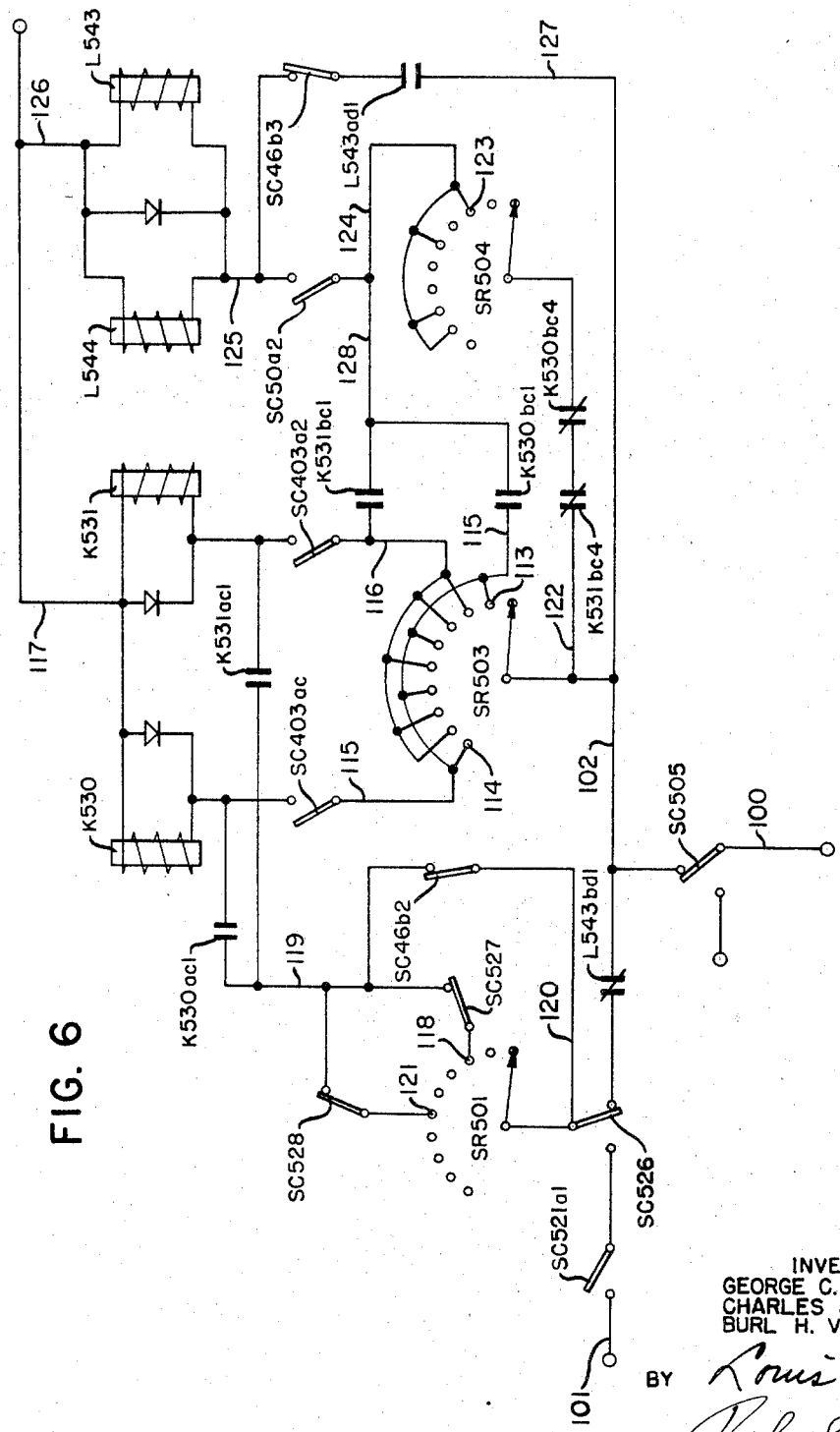

3,410,386
RECORD MATERIAL FEED CONTROL
George C. Beason and Charles J. Drozd, Dayton, and Burl H. Vick, Vandalia, Ohio, assignors to The National Cash Register Company, Dayton, Ohio, a corporation of Maryland
Filed Feb. 4, 1966, Ser. No. 525,238
2 Claims. (Cl. 197—114)

ABSTRACT OF THE DISCLOSURE

A mechanism for automatically controlling a line-spacing mechanism for operation in a business machine whenever a predetermined transaction key is operated twice during the same machine operation. An electromagnetic member operated by the actuation of a transaction key to condition a circuit means for operation, the circuit means being operated by the actuation of the transaction key a second time to operate the mechanism which controls the line-spacing mechanism of the machine.

---

This invention relates to an improvement in accounting and more particularly to a control mechanism for automatically line-spacing a record such as a ledger card or a bank passbook during a printing operation of the machine.

The machine of the present invention is one which is identified as a "bank teller's window machine" and is used in processing both savings and loan transactions. As part of each transaction, the customer's bank book is inserted into the machine and the transaction is printed. In those applications where both savings and loan transactions involve the same passbook, it is incumbent upon the operator to remember, as each succeeding savings or loan transaction is processed, whether, during the last similar transaction, the passbook was spaced to accept a new transaction. If the operator forgets to depress the line-space key at the end of the last transaction, the new transaction is printed over the last transaction. Therefore it is an object of this invention to provide a mechanism for controlling the line-spacing mechanism of the accounting machine which will automatically line-space the passbook to accept a new printer operation whenever a similar transaction has previously occurred.

With this and other, incidental, objects in view, the invention includes certain novel features of construction and combinations of parts, a preferred form or embodiment of which is hereinafter described with reference to the drawing which accompanies and forms a part of this specification.

In said drawing:

FIG. 2 is a detailed view of the line-spacing mechanism and the mechanism for controlling the effectiveness of said line-spacing mechanism;

FIG. 3 is a partial detailed view of a second mechanism for controlling the effectiveness of the line-spacing mechanism;

FIG. 4 is a detailed view of the rotary switch used in the control circuit of the line-spacing actuating mechanism;

FIG. 5 is a partial detailed view of a passbook used in the present application, showing the various column headings; and FIG. 6 is a schematic diagram of the electrical circuit used in operating the control mechanism for actuating the line-spacing mechanism.

Figure 1:
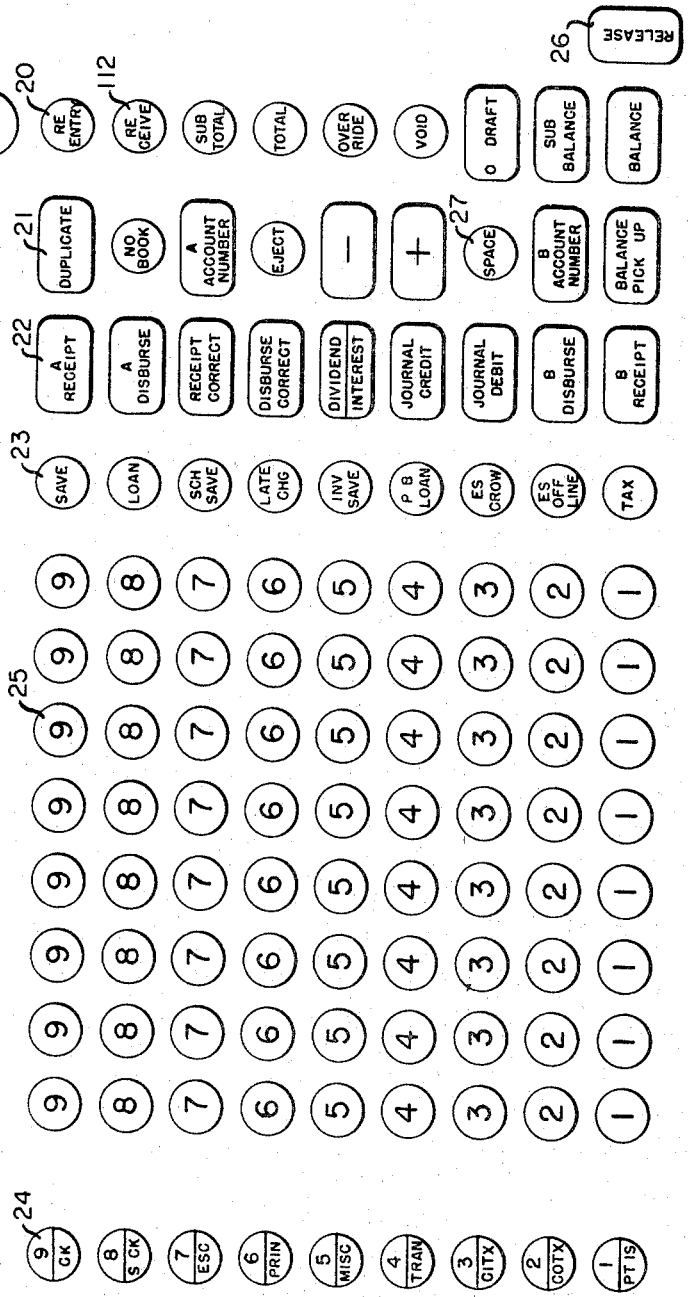
FIG. 1 is a diagrammatic view of the keyboard arrangement.

The machine in which the present invention is incorporated is of the type illustrated and described in United States Letters Patent No. 2,774,298, issued to Everett H. Placke et al. on Dec. 18, 1956, and in United States Letters Patent No. 3,158,318, issued to George C. Beason et al. on Nov. 24, 1964. The machine is characterized as an "On-Line teller machine," in which information, inserted into the keyboard, is transmitted to a central computer which updates the information and controls the machine to print out the updated information in a passbook and on a ledger card or a deposit or withdrawal slip. The present invention is utilized when the machine is used off-line; that is, when the machine is manually operated by the teller rather than by the computer.

As shown in FIG. 1, the keyboard consists of four banks of transaction keys 20 to 23 inclusive, eight banks of amount keys 25, and one bank of print keys 24. The transaction keys are supplied with titles to aid in their selection and for controlling the operation of the machine. Reference may be made to the above-cited Beason et al. United States Patent No. 3,158,318, for a further detailed description of the function of the transaction keys. Also located on the keyboard is a release key 26, which is used to release the keys from engagement if for any reason it is desired to release them after they have been depressed and before the machine has been released for operation. Included in the second transaction row 21 of keys is a space key 27, which, when depressed, controls the spacing mechanism for line-spacing the passbook and the ledger card before the next printing operation occurs.

As fully disclosed in the United States patent to Placke et al. cited previously, a customer's passbook 19 (FIG. 5) is inserted into the accounting machine on a printing table (not shown). The passbook is then fed one line-space short of the printing line. Upon operation of the machine, the passbook is fed one line-space, and data is printed on the line selected. The mechanism for feeding the passbook in a line-space operation is fully disclosed in the Placke et al. United States patent cited above, and only those parts which are pertinent to a full understanding of the present invention will now be described.

Referring to FIG. 2, there is shown the basic construction of the line-spacing mechanism for the passbook. Rotatably mounted on the shaft 28 is a sleeve 29, to which are mounted a pair of feed rollers 30 and a pinion gear 31. A gear 32, rotatably mounted on a stud 33, meshes with the pinion gear 31 and with a gear 34, secured on a shaft 35 supported by the frame of the machine. Also secured to the shaft 35 is a pair of ratchet wheels 36 and 37, which are separated by a disc 38, slightly larger in diameter than the ratchet wheels 36 and 37. The ratchet wheels 36, 37 and the disc 38 are secured together to form the unitary structure. As will be described more fully hereinafter, the ratchet wheel 36 controls the feeding of the passbook to a printing position, while the ratchet wheel 37 controls the ejection of the passbook from the machine.

Rotation of the ratchet wheels 36 and 37, the shaft 35, the gears 32 and 34, and the pinion gear 31 will rotate the feed rollers 30 a different extent by means to be described later.

The passbook is fed toward the printing position by the feed roller 30 through the action of a feed pawl 39, pivoted on an arm 40, rotatably mounted on the shaft 35. A spring 41 normally maintains the feed pawl 39 in engagement with the ratchet wheel 36. Secured to the arm 40 is a pinion gear 81, which meshes with teeth 42 on the upper side of a slide 43, slotted to slide on a pair of studs 44. A link 45 connects the slide 43 with a lever 46 pivoted on a stud 47 carried by a frame of the machine. A pitman 48 is pivoted to the upper arm of the lever 46 and is provided with a stud 49 guided in a slot 50 of an arm 51 mounted on a shaft 52. The arm 51 normally maintains the end 53 of the pitman 48 in the path of movement of a roller 58 mounted on a cam follower 86 loosely mounted on the shaft 52. A cam 78, mounted on a cam shaft 54, engages a cam roller 79, mounted on the cam follower 86. Rotation of the cam 78 rocks the cam follower 86 clockwise about the shaft 52 against the action of a spring 80, mounted between the roller 58 on the cam follower and a frame member of the machine. Reference should be made to the previously-cited Placke et al. United States patent for a complete disclosure of the cam and the cam follower.

The cam shaft 54 is rotated one revolution during each machine operation. The cam 78, mounted on the shaft 54, is so designed that during the first part of this rotation the pitman 48 is moved to the left through the action of the roller 58 of the cam follower 86 on the end 53 of the pitman 48. This movement is transmitted through the lever 46 and the cam link 45 to the slide 43, which moves to the right as viewed in FIG. 2. Movement of the slide rocks the pinion gear 81 and the arm 40 counter-clockwise through the action of the teeth 42. The feed pawl 39, mounted on the arm 40, rotates the ratchet wheel 36 a like distance, which results in rotation of the feed rollers 30 by the action of the ratchet wheel 36 on the gears 34, 32 and the pinion gear 31. The feed rollers 30 feed the passbook into a position for a printing operation. During the second part of the rotation of the cam 78, the cam follower is withdrawn from engagement with the pitman 48 under the action of the spring 80, which allows a spring 55, mounted between a frame member (not shown) of the machine and the slide 43 to move the slide leftwardly until it engages a stop stud 56 mounted on the machine. This movement returns the arm 40 clockwise towards its home position, allowing the feed pawl 39 to ratchet over the ratchet wheel 36. During this operation, an eject pawl 57, mounted on the arm 40, engages the ratchet wheel 37, which, through the gears 34, 32 and the pinion gear 31, rotates the feed rollers 30 clockwise to eject the passbook at the end of the printing operation.

During the rotation of the cam shaft 54, the cam 78 allows the pitman 48, the slide 43, and the feed pawl 39 to back up preparatory to giving the feeding mechanism a line-space operation when the machine is controlled for that purpose. The cam is so designed that, after the initial feeding operation has occurred, the cam follower 86 is moved away a short distance from the pitman 48, allowing the spring 55 to shift the slide 43 to the left a predetermined distance. Thereafter, the cam 78 again actuates the slide 43 through the action of the cam follower 86 and the pitman 48, which action is transmitted to the feed arm 40 and the feed pawl 39 to cause the feed roller 30 to line-space the passbook in the manner described previously. For a complete description of this line-space operation, reference should be made to the previously cited Placke et al. patent, No. 2,774,298, columns 48 to 50, inclusive.

The movement of the pitman 48 is partially controlled by an arm 59, which forms part of a yoke 60, the other end of which consists of a second arm, indicated as 61 (FIG. 2). Both of the arms 59 and 61 are mounted on a shaft 62. A spring 63, mounted between a link 64 and the arm 59, normally urges the arms 59 and 61 clockwise about the shaft 62 until the arm 59 engages a square stud 65, mounted on the pitman 48. When the pitman 48 moves to the left during the first part of the feed operation, the stud 65 is moved to the position shown in dotted lines, thereby allowing the spring 63 to raise the arm 59 to bring a shouldered end 66 of the arm 59 into the return path of the stud 65, thus preventing the pitman 48 from moving to the right, thereby disabling the feed mechanism to line-space and eject the passbook.

The extent of movement given to the arm 59 by the spring 63 is controlled by a stud 67 engaging the upper end 68 of the bifurcated end of the link 64. The upper end of the link 64 is pivoted on a stud 69, carried by an arm 70, pinned to a shaft 71. The arm 70 has a lower extension 72, to which is pivoted a feeler link 73, slotted to slide on the rod 74. A spring 75 normally urges the link 73 to move to the left. When the shaft 71 is rocked clockwise during a machine operation, the feeler link 73 moves to the left to project a feeler finger 76 into a series of control plates, one of which is indicated as 77. As disclosed more fully in the above-cited Placke et al. United States patent, the control plate 77 contains a series of notches corresponding to keys in the transaction banks. Depending on the control desired, depression of certain keys in the transaction bank positions either a notch or a solid surface adjacent to the feeler fingers 76.

If notches are positioned adjacent the feeler fingers 76, a sensing movement of the finger upon rotation of the shaft 71 results in the downward movement of the link 64, thereby preventing the arm 59 from engaging the stud 65 when the pitman 48 moves to the left during a feed operation. If the notching of the control plate 77 is such that the feeler finger 76 and the link 73 are arrested at the beginning of the feed operation, the link 64 is not lowered but remains in the position shown in FIG. 2. Under this setting, when the cam 78 actuates the cam follower 86 to shift the pitman 48 to the left, the stud 65 assumes the dotted-line position shown in FIG. 2, and the end 66 of the arm 59 is moved into the path of the stud 65 to arrest the pitman 48 in the projected position; therefore, the pitman 48 cannot be restored to the right (FIG. 2) to line-space or eject the passbook, as described previously.

Associated with the arm 59 in controlling the blocking of the stud 65 is a second arm, 82 (FIG. 3), positioned adjacent the pitman 48 and having a flanged portion 83, which may be positioned behind the square stud 65 after the pitman 48 has moved to the left. This action also disables the pitman 48 from moving to the right, which prevents a line-spacing operation in the same manner as described previously with regard to the arm 59. The arm 82 is a portion of a yoke which includes a hook arm 84. Both of the arms 82 and 84 are rotatably supported on the shaft 62. Pivoted to the hook arm 84 is a link 85, the lower portion of which is shown in FIG. 3, while the upper portion is shown in FIG. 2. The link 85 is controlled in a manner similar to the link 64; that is, by a feeler link (not shown) similar to the link 73 (FIG. 2) coacting with a control plate (not shown) similar to the control plate 77 (FIG. 2). Reference should be made to the previously-cited Placke et al. United States patent for a full disclosure of the link arrangement and its method of actuation.

When notches in the control plates are positioned adjacent the feeler link associated with the link 85, the link 85 moves downwardly, similarly to the action of the link 64. This downward movement of the link 85 rocks both the arms 82, 84 counter-clockwise about the shaft 62. This movement positions the hook portion 87 of the hook arm 84 about a stud 88 mounted on a link 89, thus preventing the further movement of the link 89. As disclosed more fully in the previously-cited Placke et al. United States patent, No. 2,774,298, columns 50 to 53, inclusive, the link 89 is actuated by a cam 90, mounted on the cam shaft 54, through the action of a cam follower 91, secured to one end of the link 89. The link 89, when moved to the left, functions to hold the eject pawl 57 (FIG. 2) out of engagement with its ratchet wheel 37 while the slide 43 is being backed up by the pitman 48 preparatory to a line-space operation.

The downward movement of the link 85 also positions the arm 82 and particularly the flanged portion 83 of the arm in front of the square stud 65 of the pitman 48, thereby blocking the return movement of the pitman, which prevents a line-spacing operation from occurring, in the manner described previously.

From the above disclosure it is obvious that, in order for the pitman 48 to move to the right preparatory to a line-space operation, the link 64 (FIG. 2) must be moved downwardly, while the link 85 (FIGS. 2 and 3) must be arrested in the position shown. Normally, when the space key 27 of the second transaction row 21 (FIG. 1) is depressed, the control plates effecting the setting of the links 64 and 85 are so positioned as to control the links in the manner set out above.

The control plates controlling the links 64 and 85 are also programmed to allow both of the links to move downwardly whenever the transaction keys "Escrow Off Line," "Escrow," "Late Change," and "Loan" in the fourth row 23 (FIG. 1) of the transaction keys are depressed. This operation normally positions the flanged portion 83 of the arm 82 (FIG. 3) in front of the stud 65 on the pitman 48, thereby blocking the pitman from moving to the right preparatory to the line-space operation. In order to disable this operation and thereby allow the feed mechanism to line-space the passbook, there is mounted on a frame member 92 of the machine one of a pair of space solenoids 83, represented in the schematic diagram (FIG. 6) as L544, L543. The solenoid 93 (FIG. 2) for the passbook printing station is indicated as L544 in FIG. 6, while the solenoid L543 in FIG. 6 is for the ledger printing station. Each of the solenoids has a plunger 94, to which is connected a link 95, having a downwardly-extending hooked portion 96, which extends on and over a stud 97, mounted on the link 85. Mounted on the shaft 52 is an arm 130, normally urged counter-clockwise by a spring 131. This action moves a stud 132 into engagement with the link 95, thus providing a support for the link 95. The movement of the arm 130 is controlled by a stud 133, which engages a frame member (not shown) of the machine after a predetermined length of rotation of the arm 130 has occurred.

Upon energization of the solenoid 93, the plunger 94 is drawn into the solenoid, thereby moving the hooked portion 96 of the link 95 over the stud 97. The link 95 is rotatably attached to the plunger 94 and tends to rotate about the plunger 94 upon the downward movement of the link 85. This movement of the link 85 is arrested by the shaft 52, which engages the link 95 and stops its rotation. This action stops the downward movement of the link 85, thereby conditioning the pitman 48 for a return movement to the right preparatory to a line-space operation.

Mounted adjacent the rear of the solenoid 93 are a pair of electrical contacts 98, which are actuated upon energization of the solenoid 93 by an extension 99 of the plunger 94. These contacts are indicated as L543ad1 and 6543bd1 in FIG. 6.

FIG. 6 is a schematic diagram of the electrical circuit by which the space solenoids L543, L544 are energized. When the machine is operated in the off-line mode, switches SC528, SC505, SC526, and SC527 are switched to the position shown in FIG. 6. A positive potential is applied over a conductor 100 when the machine is operated in the off-line mode and over a conductor 101 when the machine is operated in the on-line mode. When on-line, the cam-operated switch SC521a1 closes between 325 degrees and 350 degrees of the cam shaft revolution to supply a positive potential to the circuit over the conductor 101. In the present application, the potential is applied over the conductor 100 and the now-closed switch SC505 to a conductor 102. A circuit is then completed to three rotary switches SR501, SR503, and SR504, set under the control of the first 20, third 22, and fourth 23 (FIG. 1) rows of transaction keys, respectively.

FIG. 4 shows a typical mounting construction of the rotary switches. The rotary switch 103 is of conventional construction and is mounted to a frame member 104 of the accounting machine. The wiper of the switch is attached to a gear 105, rotatably mounted on the switch. The gear 105 engages a sector pinion gear 106 mounted on a shaft 107 rotatably supported on the frame member 104. A second pinion gear, 108, secured to the shaft 107, engages the tooth portion 109 of a printer rack member 110 of the transaction bank. Reference should be made to the previously-cited Placke et al. United States patent No. 2,774,298 for a full disclosure of the construction and operation of the printing rack of the transaction banks. The printing rack is positioned according to the transaction keys depressed in its associated transaction bank. This movement of the rack is transmitted by the rack teeth 109 to the gears 108, 106, and 105 and to the wiper of the rotary switch, thereby positioning the wiper commensurate with the transaction key depressed. The wiper engages one of a series of contacts 111, each representing a key in the transaction bank. The contacts 111 are wired to transmit electrical signals in a manner well known in the art.

There will now be described a typical operation of the accounting machine in the off-line mode. When the machine is off-line, the "Receive" key 112 of the first transaction row 20 is locked in a "down" position and remains so throughout the time the machine is in the off-line condition. The transaction to be described is one characterized as "Received On Account," where money is deposited to the account of the passbook holder. The account may be an escrow account or may be used to pay off a loan. In any case, the account number is first set up on the amount keyboard, the passbook and the ledger card are inserted into the machine, and an operation of the machine is initiated by depression of the "A or B Account Number" keys in the second row 21 (FIG. 1) of the transaction keys. After this initial operation has occurred, the previous balance is set up on the amount keyboard, and a second machine operation is initiated by depression of the "Balance Pick Up" key of the second row 21 (FIG. 1) of the transaction keys. During this operation, the passbook and the ledger card are transported to a position one line short of the printing position. The amount of the payment is then set up on the amount keyboard, and a machine operation is initiated by depression of either the "Receipt" key or the "A Disburse" key of the third bank 22 (FIG. 1) of transaction keys and either of the "Loan" key or the "Save" key in the fourth row 23 (FIG. 1) of the transaction bank. A key must be depressed in both banks. This operation adds the amount set up in the amount banks to the previous balance, line-spaces both the passbook and the ledger card, and prints the total on the appropriate line in the passbook and on the ledger card.

As part of this latter machine operation, the rotary switch SR503 (FIG. 6) is set according to the key depressed. Assuming in this instance that it is the "A Receipt" key, it will be seen from FIG. 6 that each transaction key contact of the switch SR503 is connected to one of two common output conductors. The "B Receipt" key contact 114 is connected to the conductor 115. When depressed, those transaction keys connected to the conductor 115 control the printer mechanism to print out in either the third column 16 (FIG. 5) or the sixth column 18 (FIG. 5) of the passbook or the ledger card, depending on the transaction key that is depressed in Row 23. Included in the transaction keys connected to the conductor 115, in addition to the "B Receipt" key, are the "Journal Credit" key, the "Receipt Correct" key, and the "A Receipt" key. The remaining transaction key contacts of Row 22 are connected to a conductor 116, these keys controlling the printing mechanism to print out in either the second column 15 (FIG. 5) or the fifth column 17 (FIG. 5), depending on the Row 23 transaction key depressed with it. Reference should be made to the previously-cited Placke et al. United States patent for a complete disclosure of the control of the printing mechanism by the transaction keys.

In addition to the "A Receipt" key of Row 22, it will be assumed that the "Loan" key of Row 23 will be depressed. Upon the setting of the rotary switches SR503 and SR504 according to the key depressed, an energizing circuit is completed from the conductor 100, over the now-closed switch SC505, the conductor 102, the wiper of the switch SR503, the contact 113 representing the "A Receipt" key, the conductor 115, the cam-operated switch SC403ac, which is closed from 300 degrees to 325 degrees of revolution of the cam shaft, to the space memory relay K530, which is energized, thereby closing a number of switch contacts. The circuit is completed over a conductor 117 to ground. It will be seen that, if another transaction key of Row 22 which has a switch contact connected to the conductor 116 (FIG. 6) is depressed, an energizing circuit is completed to the relay K531 over cam switch contact SC403a2, which operates similarly to the contact SC403ac. In either case, one of the space memory relays K530, K531 will be energized whenever a transaction key in the third row 22 (FIG. 1) is depressed.

The energization of the relay K530 results in the closing of the contacts K530ac1, thereby completing a holding energizing circuit to the relay K530 over the conductor 100, the switch contact SC505, the normally-closed switch contacts L543bd1, the closed switch SC526, the wiper of switch SR501, a contact 118, corresponding to the "Receive" key 112 of the first transaction row 20, the closed switch SC527, a conductor 119, the closed contact K530ac1 to the relay K530. When the machine is on-line a similar holding circuit is completed over the conductor 101, the closed switch contact SC521a1, switch SC526, a conductor 120, and the switch contact SC46b2, which is closed between 270 degrees and 330 degrees of revolution of the cam shaft. A holding circuit is also completed to the space memory relays K530, K531 when the "Override" key of Row 20 is depresed, thus completing the circuit over a contact 121 of the rotary switch SR501, the switch SC528, and the conductor 119.

Prior to the closing of the cam-operated switch contact SC403ac, which occurs at 300 degrees of revolution of the cam shaft, an energizing circuit is completed over conductor 102, conductor 122, the closed relay contacts K531bc4, K530bc4, the wiper of switch SR504, contact 123, representing the "Loan" key of Row 23, conductor 124, the cam-operated switch contact SC50a2, which closes between 90 degrees and 150 degrees of revolution of the cam shaft, conductor 125 to both the space solenoids L544, L543, represented in FIG. 2 as 93. The circuit is completed to ground over a conductor 126. As previously described, the energization of the solenoids L544 and L543 results in the latching of the link 85 (FIG. 2), thus insuring that a line-space operation occurs in both the passbook and the ledger printing sections. Energization of the solenoid L543 results in the opening of contact L543bd1, thus preventing the holding circuit from being made to the relays K530, K531; and the closing of contacts L543ad1, thus completing a holding circuit to the solenoids. This allows the solenoids to remain energized when the cam-operated switch contacts SC50a2 are opened at 150 degrees of revolution of the main cam shaft. This holding circuit is completed from the conductors 102 and 127, the closed switch contact L543ad1, the cam-operated switch contacts SC46b3, which open between 270 degrees and 330 degrees of revolution of the cam shaft, and the conductor 125 to the solenoids L543 and L544.

When the main cam shaft of the machine reaches 300 degrees of revolution, the switch contacts SC403ac and SC403a2 close, as described previously, and one of the space memory relays K530, K531 is energized. This results in the opening of one of the relay contacts K531bc4 or K530bc4, thus interrupting the energizing circuit to the solenoids L544 and L543. The solenoids L544 and L543 at this time are de-energized, which occurred upon the opening of the contacts SC46b3 at 270 degrees of revolution of the cam shaft, as described above, which resulted in the closing of the contacts L543db1, thus allowing the holding circuit for the relays K530 and K531 to be completed over the switch SR501 and the now-closed switch contacts K530ac1.

The energizing of the relay K530 also results in the closing of the contacts K530bc1, which, coupled with the opening of K530bc4, forces the energizing circuit to be completed through the switch SR503. Thus if, during the same transaction, the operator repeats the use of a transaction key in Row 22, which in the present example is one which is connected to the conductor 115, an energizing circuit is completed over the conductor 115, the closed switch contact K530bc1, a conductor 128, the switch contacts SC50a2, and the conductor 125 to the solenoids L543, L544. A similar result would occur upon the energization of the relay K531 and the depression of any of the transaction keys of the third transaction row 22 (FIG. 1) which is connected to the conductor 116 (FIG. 6). In this case, the energizing circuit would be completed over the conductor 116, the now-closed switch contacts K531bc1, the conductor 128, the switch contacts SC50a2, and the conductor 125 to the solenoids L543 and L544. As previously described, the energization of either of these two solenoids moves the link 95 (FIG. 2) into a latching position over the stud 97, thus preventing the downward movement of the link 85. This allows the pitman 48 to be moved in a back-up direction preparatory to a linespace operation, which operation occurs during the cycling of the machine. Thus it will be seen that the operator need not remember whether a particular transaction key had previously been used in the transaction in order to insure that the printing of this phase of the transaction will not overlap a previously-printed operation on the same line. The last machine operation occurs when the "Balance" key in Row 20 of the transaction bank is depressed. The other transaction keys in Row 21 or Row 22 are depressed. During this machine operation, the rotary switches SR503, SR504 are set in their home positions, while the switch SR501 is set in its No. 1 position. The setting of these switches interrupts the circuits to the relays K530, K531 and the solenoids L543, L544.

What is claimed is:

1. In an accounting machine having a first, second, and third bank of transaction keys, a mechanism for linespacing a record material preparatory to printing information on the line spaced, an actuating member slidably mounted for movement to a position to actuate said line-spacing mechanism during each operation of the machine, a control member mounted for movement to a position disabling the movement of said actuating member, means for moving said control member to said disabling position; means for selectively disabling said control member including (a) control means mounted adjacent said control member for disabling the movement of said control member when actuated;
  (b) first electromagnetic means engaging said control means for actuating said control means when energized;
  (c) a first circuit means for energizing said first electromagnetic means;
  (d) first switch means located in said first circuit means and set under the control of certain transaction keys in said first transaction bank to enable said first circuit means to energize said first electromagnetic means whereby the line-space mechanism is operated during a first machine operation;
  (e) a second electromagnetic means;
  (f) a second circuit means for energizing said second electromagnetic means;
  (g) a second switch means located in said second circuit means set under the control of certain transaction keys in said second transaction bank to enable said second circuit means to energize said second electromagnetic means during a first machine operation;

(h) a normally closed switch means on said first circuit means controlled by said second electromagnetic means to interrupt said first circuit means upon energization of said second electromagnetic means;

(i) a third circuit means for energizing said second electromagnetic means;

(j) third switch means located on said third circuit means and set under the control of certain transaction keys in said third transaction bank to condition said circuit to energize said electromagnetic means;

(k) a normally open switch means in said third circuit means which closes upon energization of said second electromagnetic means to energize said second electromagnetic means during a subsequent machine operation;

(l) a fourth circuit means for energizing said first electromagnetic means, said fourth circuit means including said second switch means;

(m) and a normally open switch means in said fourth circuit means which closes upon the energization of said second electromagnetic means whereby upon the subsequent use of one of said transaction keys used to energize said second electromagnetic means, said first electromagnetic means is energized to actuate said control means.

2. The machine of claim 1 in which said control means includes (a) a stud mounted on said control member;

(b) a link member mounted adjacent said control member, said link member having one end connected to the first electromagnetic means and the other end having a hook portion positioned adjacent said stud;

(c) and means for supporting said link member for movement whereby, upon the energization of the first electromagnetic means, the hook portion of said link member latches the stud of said control member, thereby disabling the movement of said control member.

References Cited
UNITED STATES PATENTS

| | | | |
|---|---|---|---|
| 2,774,298 | 12/1956 | Placke et al. | 101—93 |
| 2,935,934 | 5/1960 | Williams et al. | 101—93 |
| 3,158,318 | 11/1964 | Beason et al. | 235—146 |

ROBERT E. PULFREY, *Primary Examiner.*

E. T. WRIGHT, *Assistant Examiner.*